United States Patent
Hu et al.

(10) Patent No.: US 8,259,539 B1
(45) Date of Patent: Sep. 4, 2012

(54) INTEGRATION OF A VERTICAL CAVITY SURFACE EMITTING LASER (VCSEL) ON AN ENERGY-ASSISTED MAGNETIC RECORDING (EAMR) HEAD

(75) Inventors: Yufeng Hu, Fremont, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 658 days.

(21) Appl. No.: 12/337,403

(22) Filed: Dec. 17, 2008

(51) Int. Cl.
*G11B 11/00* (2006.01)

(52) U.S. Cl. .................. 369/13.33; 369/13.13

(58) Field of Classification Search ........... 369/13.13, 369/13.33, 13.32, 112.09, 112.14, 112.21, 369/112.27; 360/59; 385/129, 31, 88–94; 250/201.3, 201.5
See application file for complete search history.

(56) References Cited

U.S. PATENT DOCUMENTS

| | | | |
|---|---|---|---|
| 5,140,569 A | 8/1992 | Nebashi | |
| 5,199,090 A | 3/1993 | Bell | |
| 5,440,530 A | 8/1995 | Fedeli et al. | |
| 5,986,978 A | 11/1999 | Rottmayer et al. | |
| 6,160,834 A | 12/2000 | Scott | |
| 6,181,673 B1 | 1/2001 | Wilde et al. | |
| 6,404,706 B1 | 6/2002 | Stovall et al. | |
| 6,762,977 B1 | 7/2004 | Gage et al. | |
| 6,807,131 B1 | 10/2004 | Hesselink et al. | |
| 6,996,033 B2 | 2/2006 | Dugas et al. | |
| 7,057,999 B2 | 6/2006 | Cheong et al. | |
| 7,069,569 B2 | 6/2006 | Thornton et al. | |
| 7,133,230 B2 | 11/2006 | Saga et al. | |
| 7,151,785 B2 | 12/2006 | Liu et al. | |
| 7,158,470 B2 | 1/2007 | Thornton et al. | |
| 7,203,387 B2 | 4/2007 | Doan | |
| 7,215,629 B2 | 5/2007 | Eppler | |
| 7,327,667 B2 | 2/2008 | Thornton et al. | |
| 7,345,840 B2 | 3/2008 | Gomez et al. | |
| 7,349,614 B2 | 3/2008 | Doan | |
| 7,372,648 B2 | 5/2008 | Akiyama et al. | |
| 7,412,143 B2 * | 8/2008 | Rottmayer et al. | 385/129 |
| 7,663,981 B2 * | 2/2010 | Ueyanagi | 369/13.13 |
| 2003/0198146 A1 | 10/2003 | Rottmayer et al. | |
| 2005/0122849 A1 | 6/2005 | Ueyanagi | |
| 2008/0056073 A1 * | 3/2008 | Shimizu | 369/13.02 |
| 2008/0316872 A1 * | 12/2008 | Shimizu et al. | 369/13.24 |
| 2010/0165801 A1 * | 7/2010 | Boone et al. | 369/13.11 |
| 2011/0026377 A1 * | 2/2011 | Shimazawa et al. | 369/13.24 |
| 2011/0090587 A1 * | 4/2011 | Chou et al. | 360/59 |
| 2011/0122737 A1 * | 5/2011 | Shimazawa et al. | 369/13.24 |

* cited by examiner

*Primary Examiner* — Tan X Dinh

(57) ABSTRACT

An energy-assisted magnetic recording apparatus comprises a magnetic recording head having an end surface and an interface surface perpendicular to the end surface. The apparatus further comprises a vertical cavity surface emitting laser (VCSEL) bonded to the interface surface and configured to emit laser light through the interface surface and into the magnetic recording head. The magnetic recording head includes one or more light redirecting structures for redirecting the laser light towards the end surface. A method of making an energy-assisted magnetic recording apparatus comprises the steps of aligning a first wafer including a plurality of VCSELs with a second wafer including a plurality of magnetic recording heads, such that an emitting region of each of the plurality of VCSELs is disposed over a light redirecting structure of a corresponding one of the plurality of magnetic recording heads, and bonding the first wafer to the second wafer.

12 Claims, 4 Drawing Sheets

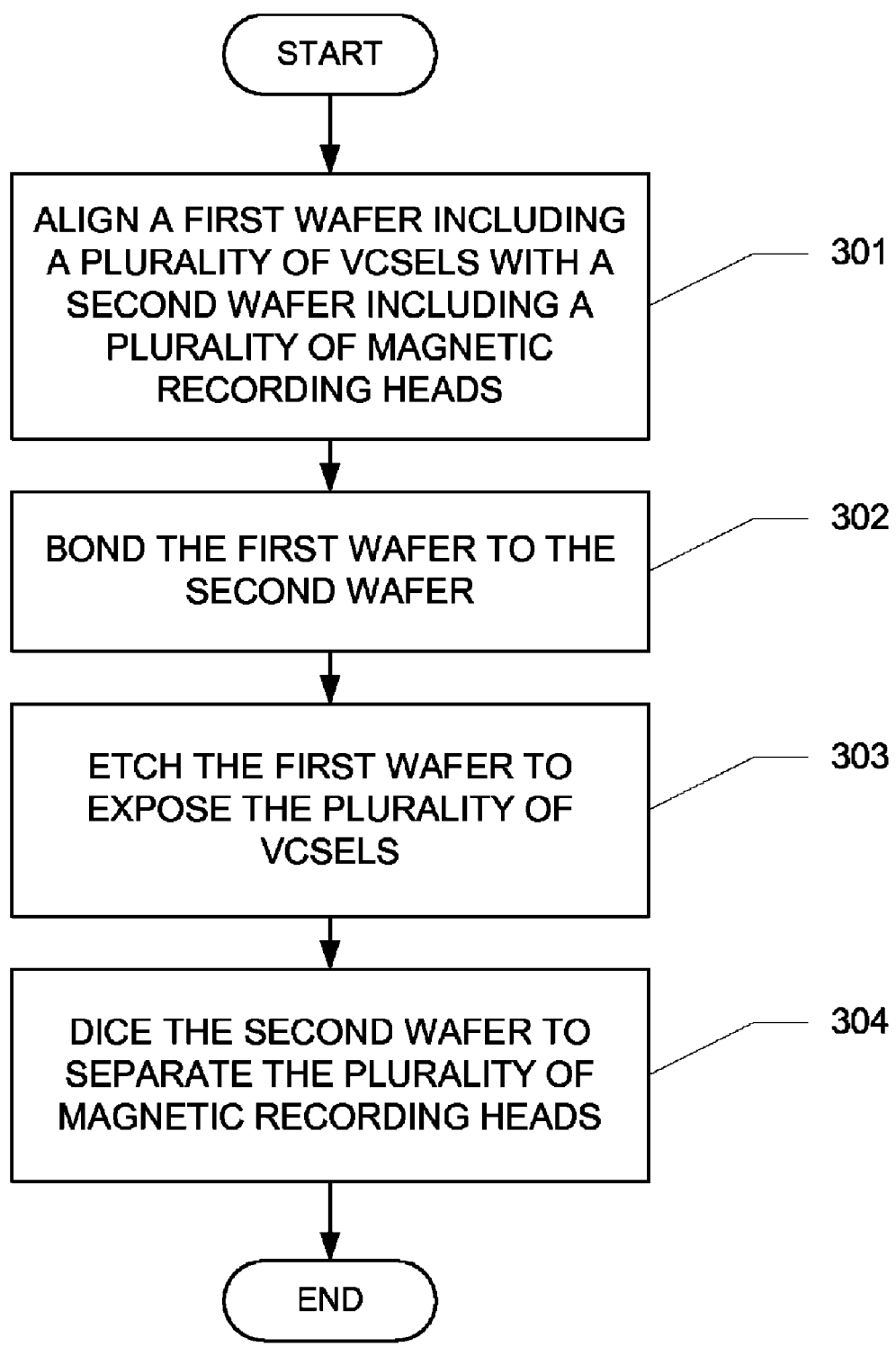

INTEGRATION OF A VERTICAL CAVITY SURFACE EMITTING LASER (VCSEL) ON AN ENERGY-ASSISTED MAGNETIC RECORDING (EAMR) HEAD

FIELD OF THE INVENTION

The present invention generally relates to energy-assisted magnetic recording (EAMR) and, in particular, relates to the integration of a vertical cavity surface emitting laser (VCSEL) on an EAMR head.

BACKGROUND OF THE INVENTION

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy assisted magnetic recording (EAMR) is used to address this challenge. In an EAMR system, a small spot where data is to be written is locally heated to reduce the coercivity of the magnetic grains therein for the duration of the write operation, thereby allowing materials with increased magnetic anisotropy to be used, and greater areal storage density to be exploited.

Several approaches to providing a heat source in an EAMR system have been tried. One approach involves fabricating a laser diode inside the slider of a magnetic recording head. This approach requires a semiconducting wafer or some semiconducting materials (e.g., GaAs and AlGaAs) for fabricating the slider, which would complicate the magnetic head fabrication process and would greatly increase the cost of the slider. Another approach involves mounting the laser remote from the head and carrying the laser beam to the slider through an optical fiber. This approach might require integrating and aligning multiple optical fibers and other optical components into a laser-slider assembly, which would also increase the cost and time required to produce the magnetic recording head.

SUMMARY OF THE INVENTION

Various embodiments of the present invention solve the foregoing problem by providing an energy-assisted magnetic recording apparatus in which VCSELs are bonded to corresponding magnetic recording heads during wafer processing. This approach provides a reliable heat source for EAMR using reliable wafer bonding techniques, and greatly reduces the cost and complexity of integrating laser light into an EAMR system.

According to one embodiment of the subject disclosure, an energy-assisted magnetic recording apparatus comprises a magnetic recording head having an end surface and an interface surface perpendicular to the end surface. The apparatus further comprises a vertical cavity surface emitting laser (VCSEL) bonded to the interface surface and configured to emit laser light through the interface surface and into the magnetic recording head. The magnetic recording head includes one or more light redirecting structures for redirecting the laser light towards the end surface.

According to another embodiment of the subject disclosure, a method of making an energy-assisted magnetic recording apparatus comprises the steps of aligning a first wafer including a plurality of vertical cavity surface emitting lasers VCSELs with a second wafer including a plurality of magnetic recording heads, such that an emitting region of each of the plurality of VCSELs is disposed over a light redirecting structure of a corresponding one of the plurality of magnetic recording heads, and bonding the first wafer to the second wafer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 3 is a flowchart illustrating a method of making an energy-assisted magnetic recording apparatus in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

A vertical cavity surface emitting laser (VCSEL) is a type of semiconductor laser diode in which the laser light is emitted out-of-plane (e.g., from either a top or bottom surface thereof), as opposed to conventional in-plane semiconductor lasers which emit laser light from their edge surfaces (after being cleaved out of the wafer in which they are fabricated). Because VCSELs can emit laser light from the top or bottom surface of the chip in which they are embedded, a wafer containing VCSELs can be aligned with and bonded to a wafer containing magnetic recording heads before the wafers are diced into individual devices. After the wafers are aligned and bonded face to face or back to face, they can then be thinned and interconnected prior to additional stacking processes or dicing. Wafer bonding and wafer-to-wafer alignment are mature technologies with which those of skill in the art will be well familiar.

VCSELs enjoy a number of advantages over edge-emitting lasers, especially when implemented in an EAMR system. For example, the wavelength stability and uniformity of a VCSEL, together with its relative insensitivity to temperature, ensure that the EAMR head can operate at maximum efficiency without experiencing wavelength drift. In this regard, during operation, the temperature inside a hard disk drive is around 60° C., and the temperature on the magnetic head where the laser is attached would be a little higher during writing operations. As a VCSEL can operate reliably up to 80° C. or higher, an EAMR hard drive employing the VCSEL will enjoy reliability, and can be simply designed, as no cooling system will be required for the VCSEL. The high power output and low power consumption of the VCSEL is another advantage for use in an EAMR system, reducing the overall power consumption for the hard drive.

Figure 1:
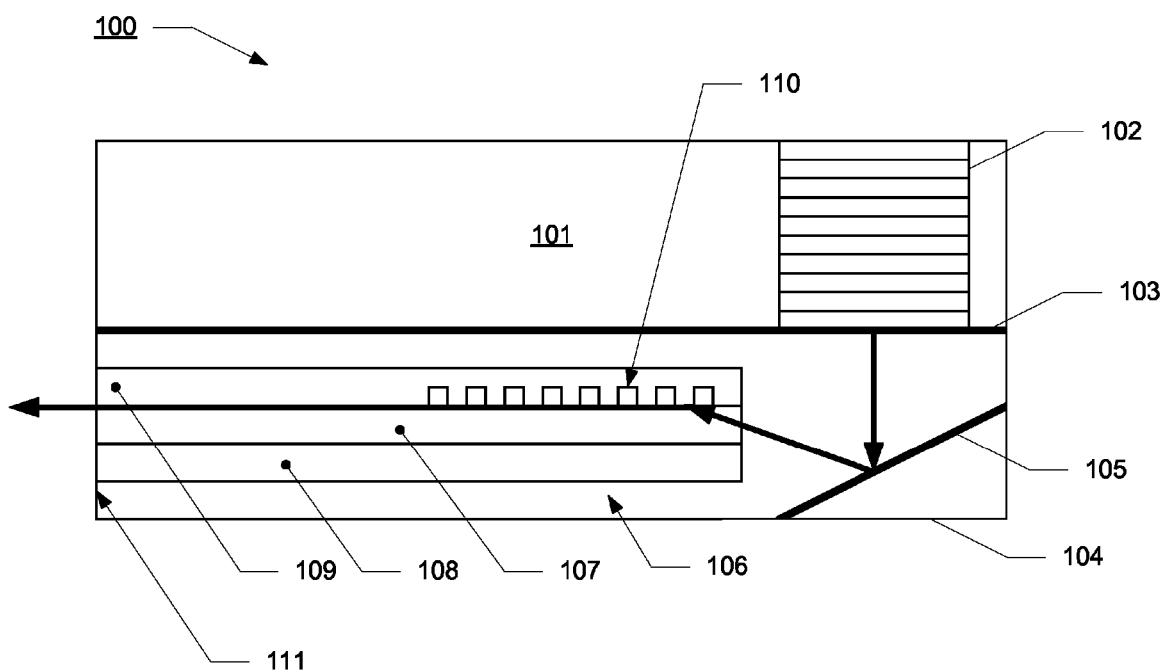
FIG. 1 illustrates an energy-assisted magnetic recording apparatus in accordance with one aspect of the subject disclosure.

FIG. 1 illustrates a partial cross-sectional view of an energy-assisted magnetic recording apparatus 100 in accordance with one aspect of the subject disclosure. EAMR apparatus 100 includes a layer 101 in which a vertical cavity surface emitting laser (VCSEL) 102 is disposed. VCSEL 102 is bonded to an interface surface 103 of a magnetic recording head 104, into which VCSEL 102 is configured to emit laser light through interface surface 103. The laser light passes vertically into magnetic recording head 104 (e.g., in the present exemplary embodiment, into an alumina cladding layer and/or an alumina overcoat film of magnetic recording head 104).

Because VCSEL 102 emits laser light perpendicular to interface surface 103, magnetic recording head 104 includes light redirecting structures to redirect the laser light towards air bearing surface 111, which is perpendicular to interface surface 103, and out towards the media which is to be heated. In the present exemplary embodiment, magnetic recording head 104 includes a mirror 105 configured to reflect the laser light towards a diffractive grating 110, which couples the laser light into a core layer 107 of waveguide 106, which directs the laser light towards air bearing surface 111.

In accordance with one aspect of the subject disclosure, mirror 105 comprises a film of material with a high reflectivity at the wavelength of the laser light emitted by VCSEL 102. For example, mirror 105 may be a layer of any one of a number of reflective metals, such as aluminum (Al), silver (Ag), gold (Au), copper (Cu), or any alloy thereof. One benefit of utilizing the foregoing exemplary materials for the fabrication of mirror 105 is their compatibility with conventional head fabrication processes (e.g., mill & lap, damascene, etc.).

Waveguide 106 includes a core layer 107 and cladding layers 108 and 109. According to one aspect of the subject disclosure, core layer 107 has a higher refractive index than the refractive indices of cladding layers 108 and 109. For example, in accordance with one exemplary aspect of the subject disclosure, core layer 107 may be fabricated from a high refractive index material such as $TiO_2$ or $Ta_2O_5$, while cladding layers 108 and 109 may be fabricated from low refractive index materials such as $SiO_2$ and/or $Al_2O_3$. One benefit of utilizing the foregoing exemplary materials for the fabrication of waveguide 106 is their compatibility with conventional head fabrication processes (mill & lap, damascene, etc.).

Figure 2A:
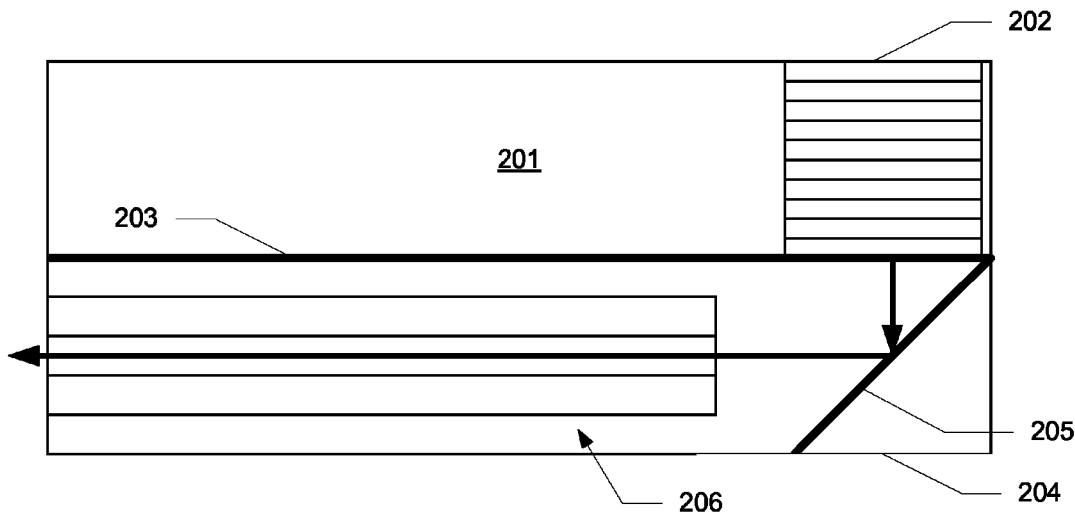
FIG. 2a illustrates an energy-assisted magnetic recording apparatus in accordance with one aspect of the subject disclosure.

Because VCSELs produce a circular beam without complex beam-shaping optics, it is relatively simple to couple the light output by VCSEL 102 into waveguide 106. In this regard, while the foregoing exemplary EAMR apparatus has been illustrated as including both a minor and a diffractive grating for coupling the laser light from a VCSEL into a waveguide, the scope of the present invention is not limited to such an arrangement. For example, FIG. 2a illustrates an EAMR apparatus in accordance with one aspect of the subject disclosure, in which a VCSEL 202 in a first layer 201 provides laser light perpendicular to and through an interface surface 203 into magnetic recording head 204, where the laser light is redirected by a single minor 205 into a waveguide 206.

Figure 2B:
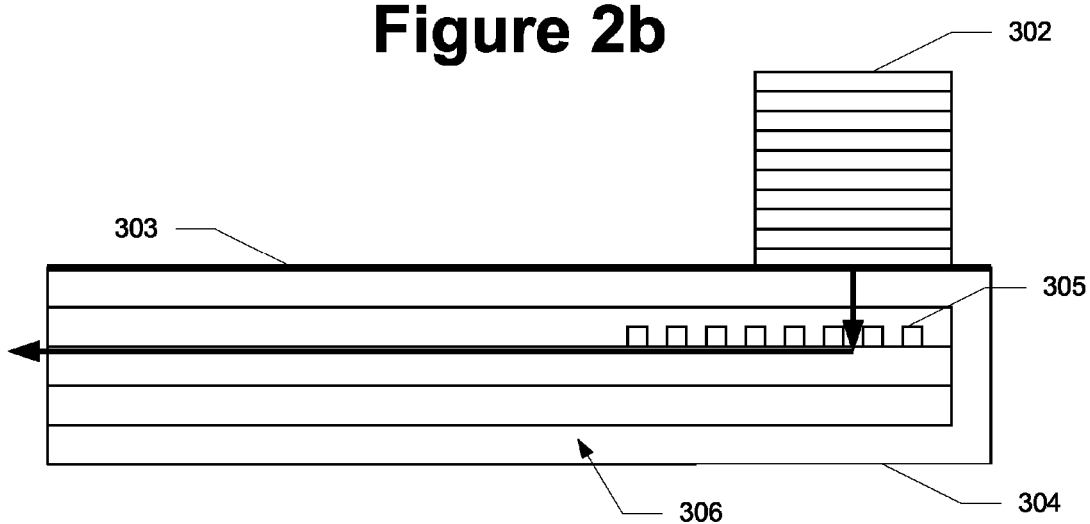
FIG. 2b illustrates an energy-assisted magnetic recording apparatus in accordance with one aspect of the subject disclosure.

Alternatively, FIG. 2b illustrates an EAMR apparatus in accordance with another aspect of the subject disclosure, in which a VCSEL 302 is disposed on an interface surface 303 of a magnetic recording head 304. In this exemplary aspect, the wafer layer in which VCSEL 302 was originally disposed has been etched away. Laser light emitted by VCSEL 302 perpendicular to interface surface 303 is redirected by a diffractive grating 305 and coupled into waveguide 306.

While in the foregoing exemplary embodiments, the magnetic recording heads have been illustrated with reference only to an alumina cladding layer and/or an alumina overcoat film, those of requisite skill in the art will readily understand that magnetic recording heads may include additional structures, such as a slider body and a transducer comprising read and write heads, whose function and manufacture are well known and therefore not illustrated herein.

Figure 4A:
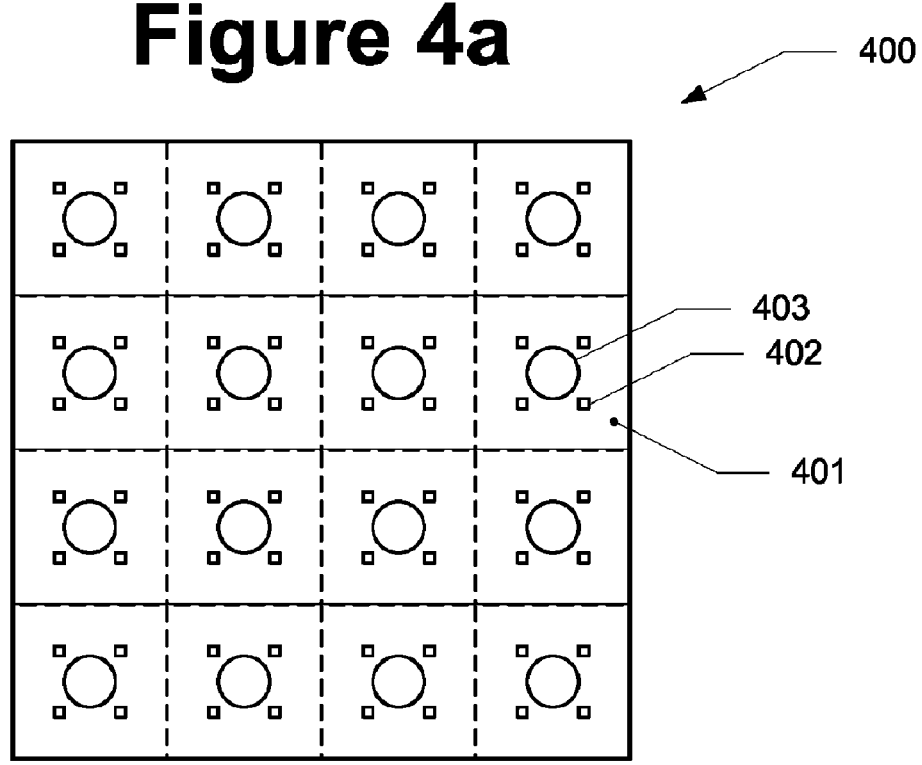
FIGS. 4a and 4b illustrate a wafer containing VCSEL structures and a wafer containing magnetic recording heads prior to wafer bonding, in accordance with one aspect of the subject disclosure.
Figure 4B:
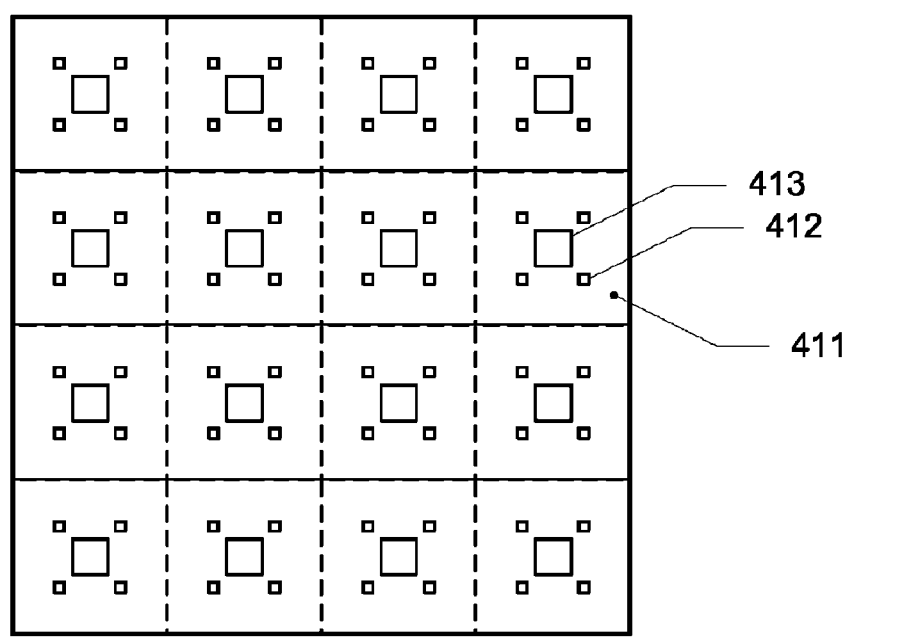

FIG. 3 is a flowchart illustrating a method of making an energy-assisted magnetic recording apparatus in accordance with one aspect of the subject disclosure. The method begins in step 301, in which a first wafer including a plurality of VCSELs is aligned with a second wafer including a plurality of magnetic recording heads, such that an emitting region of each VCSEL is disposed over a light redirecting structure of a corresponding one of the plurality of magnetic recording heads. Turning briefly to FIG. 4, two such wafers are illustrated in accordance with one aspect of the subject disclosure. Wafer 400 includes a plurality of VCSELs 401, each of which has an emitting region 403. The emitting regions 403 are aligned with the light redirecting structures 413 (e.g., minors, diffraction gratings, waveguides, etc.) of the magnetic recording heads on wafer 410.

Each VCSEL 401 also includes one or more contact pads 402, which may be used to provide electrical power to each VCSEL 401, and may also be used to facilitate the bonding of wafers 400 and 410. Contact pads 402 on wafer 400 are aligned with contact pads 412 on wafer 410 and are interconnected thereto during the wafer bonding process. Returning to FIG. 3, in step 302, the first and second wafers are bonded face-to-face, using wafer bonding techniques well known to those of skill in the art. Because the VCSELs can be bonded to the corresponding magnetic recording heads while both structures are still in their respective wafers, this bonding step requires minimum process time, which allows for lower-cost fabrication of EAMR-integrated heads.

Continuing on with the method of FIG. 3, in step 303, the first wafer is optionally etched from the backside to remove the substrate and expose the plurality of VCSELs. In step 304, the second wafer is processed and diced to separate the plurality of magnetic recording heads to which the VCSELs are attached.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An energy-assisted magnetic recording apparatus comprising:
    a magnetic recording head having an end surface and an interface surface perpendicular to the end surface; and
    a vertical cavity surface emitting laser (VCSEL) bonded to the interface surface and configured to emit laser light through the interface surface and into the magnetic recording head;
    wherein the magnetic recording head includes one or more light redirecting structures for redirecting the laser light towards the end surface.

2. The energy-assisted magnetic recording apparatus of claim 1, wherein the VCSEL is configured to emit laser light perpendicular to the interface surface.

3. The energy-assisted magnetic recording apparatus of claim 1, wherein the one or more light redirecting structures include a mirror configured to reflect the laser light towards the end surface.

4. The energy-assisted magnetic recording apparatus of claim 3, wherein the mirror comprises a film of metal selected from the group consisting of aluminum (Al), silver (Ag), gold (Au) and copper (Cu).

5. The energy-assisted magnetic recording apparatus of claim 1, wherein the one or more light redirecting structures include a waveguide.

6. The energy-assisted magnetic recording apparatus of claim 5, wherein the one or more light redirecting structures comprises a diffractive grating to couple the laser light into the waveguide.

7. The energy-assisted magnetic recording apparatus of claim 5, wherein the waveguide includes a core layer and a cladding layer, and wherein the core layer has a higher refractive index than a refractive index of the cladding layer.

8. The energy-assisted magnetic recording apparatus of claim 7, wherein the one or more light redirecting structures comprises a diffractive grating to couple the laser light into the core layer of the waveguide.

9. The energy-assisted magnetic recording apparatus of claim 1, wherein the interface surface comprises one or more contact pads for providing power to the VCSEL.

10. The energy-assisted magnetic recording apparatus of claim 9, wherein the contact pads are also for bonding the VCSEL to the interface surface.

11. The energy-assisted magnetic recording apparatus of claim 1, wherein the end surface is an air bearing surface.

12. A magnetic disk drive comprising:
    the energy-assisted magnetic recording apparatus of claim 1; and
    a magnetic media opposite the end surface of the magnetic recording head.

* * * * *